Feb. 8, 1949. S. R. BRENTNALL 2,460,804
AUXILIARY CONTROL SURFACE FOR HIGH SPEED AIRCRAFT
Filed May 22, 1944
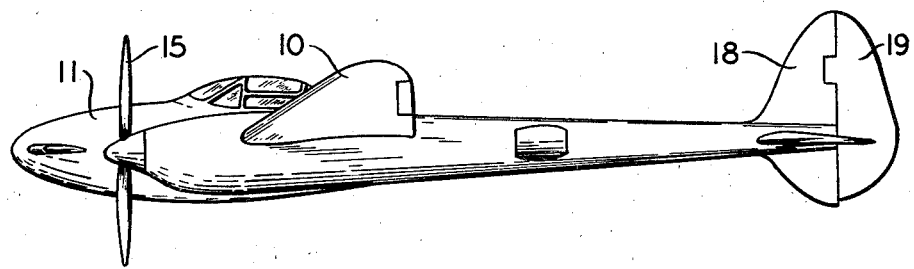
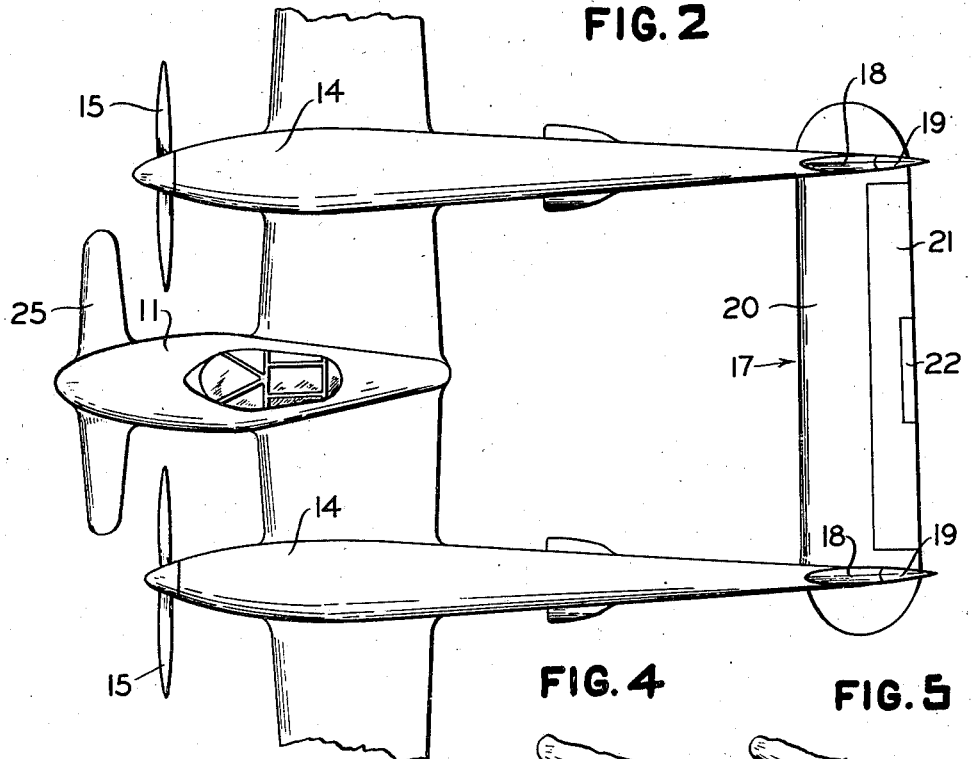
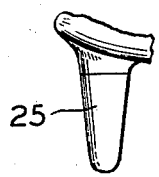
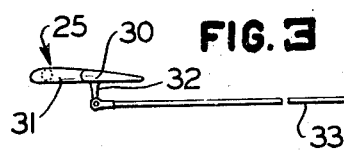
INVENTOR
SAMUEL R. BRENTNALL
BY
ATTORNEYS

Patented Feb. 8, 1949

2,460,804

UNITED STATES PATENT OFFICE 2,460,804

AUXILIARY CONTROL SURFACE FOR HIGH-SPEED AIRCRAFT

Samuel R. Brentnall, Washington, D. C.

Application May 22, 1944, Serial No. 536,660

4 Claims. (Cl. 244—13)

(Granted under the act of March 3, 1883, as amended April 30, 1928; 370 O. G. 757)

The invention described herein may be manufactured and used by or for Government for governmental purposes, without the payment to me of any royalty thereon.

This invention relates to auxiliary control surfaces for use primarily with high speed aircraft.

Present experiences with high speed military aircraft, particularly the type having a central cabin enclosure or nacelle arranged in close proximity to a pair of motor nacelles have tended to show that the areas immediately adjacent the nacelles and particularly between the motor nacelles and the cabin act in the same manner as Venturi tubes and that in these areas, as well as the area outside the motor nacelles, the air speed usually exceeds the speed of the aircraft due to this Venturi action. During dives, when the velocity of the plane may rise to from four to six hundred miles per hour, the velocity of air passing between the motor nacelles and the central cabin, as well as the air passing on the outside of the motor nacelles may increase, due to the Venturi action, to a point where it approaches, or even exceeds, the velocity of sound at that altitude.

Whenever the velocity of the air approaches a considerable percentage of the velocity of sound, usually from sixty to seventy percent thereof, there is a distinct tendency of air upon striking any obstruction to break up into what may be termed a burbling air stream rather than to follow the airform path. Since the velocity of sound is a function of atmospheric temperature these waves tend to form at different speeds at different elevations. At high elevations, where the speed of sound is considerably less than at sea level, burbling would occur at much less air speed than at sea level. When such waves are formed, the air breaks up into eddies or burbling.

Such burbling is apt to originate upon any obstruction, such as the edge of a wing, but is most likely to originate at re-entrant edges, such as at the point of intersection of the nacelles with the wing surface, and on flaps or other obstructions which break the continuing of the air stream or they may occur at several such points simultaneously.

When the burbling originates at more than one point, the patterns may overlap and thus cover wide areas, and in such cases the tail structure may be entirely within the area of one or more of these areas. Should the tail structure of a plane become shrouded in such an eddy, it would immediately lose its effectiveness and the plane controllability decreases until such time as the tail emerges from the burbling area, or the burbling ceases.

It is an object of the present invention to improve the control of high speed aircraft.

Another object of the present invention is to provide an auxiliary control for high speed aircraft in the event that primary control becomes blanketed out.

Another object is to neutralize the effect of compressibility waves in the air.

A further object is to insure greater safety in high speed aircraft.

Other objects will become apparent from consideration of the following specifications, which, when taken in conjunction with the accompanying drawings, discloses preferred forms of the invention.

According to the present invention, a supplemental surface is provided in an area not normally affected by turbulent wake, which surface is adapted to create a lift to the nose of the plane upon loss of effectiveness of the elevator and restore control of the plane.

In the drawings, Fig. 1 is a side elevational view of an airplane involving the present invention;

Fig. 2 is a plan view of the plane shown in Fig. 1;

Fig. 3 is a fragmentary side elevational view of a modification of the invention;

Fig. 4 is a fragmentary plan view of the modification shown in Fig. 3; and

Fig. 5 is a fragmentary plan view of a second modification.

Referring to the drawings, the aircraft is shown as being a monoplane having wings 10, a central cabin nacelle 11, a pair of motor nacelles 14—14, housing motors (not shown) which drive propellers 15—15. As shown, the motor nacelles carry the tail structure generally designated 17.

The tail structure 17 includes vertical fins 18—18 which mount rudders 19—19, and a stabilizer 20 mounting an elevator 21. The elevator 21 has a trim tab 22 mounted thereon.

The cabin nacelle 11 extends in front of the wings 10 and the propellers 15, and has mounted thereon supplemental wing surfaces 25. The wing surfaces 25 are preferably made with a high aspect ratio, being substantially the same as the aspect ratio of the tail surface, so as to produce a lift curve of comparable slope. In the form of airplane shown, the wing surfaces 25 are mounted ahead of both the wings 10 and the propellers and are also forward of the center of gravity of the airplane and are designed to give a constant uplift on the nose of the airplane, which, during normal flight of the airplane, may be trimmed out through the trim tab 22, or neutrally trimmed by means shown in Fig. 4 and Fig. 5.

In operation, the trim tab 22 balances the effect of the supplemental wing surfaces 25 and normal control of the airplane is maintained through the vertical rudders 19—19 and the elevator 21. During high speed dives, however, the speed of the air passing between the central cabin nacelle and the motor nacelles, as well as the air speed on the outside of the motor nacelles, may increase due to the Venturi action to a point where it approaches the speed of sound at that altitude with the result that turbulent wake from the wing or nacelles may develop and blanket the tail structure, gradually reducing the effect of the tail structure to near zero. When this blanketing occurs the supplemental wing surface, being out of the area of excessively high velocity, and not subject to turbulent wake from any other surface will exert an upward force sufficient to bring the plane out of the dive and restore control to the tail surfaces as the speed reduces, the trim tab 22 at this time being ineffective to counterbalance the upward force of the auxiliary wing surface 25.

Instead of having the auxiliary or supplemental wing surfaces 25 of Figs. 1 and 2 entirely fixed, it may be provided with auxiliary elevators 30, as indicated in Figs. 3 and 4, the auxiliary elevators 30 being pivotally mounted on a fixed or stabilizing portion 31 of the supplemental wing surface, heretofore generally designated 25.

The elevators 30 are arranged to be actuated by a torque tube extending through the cabin enclosure 11. The torque tube is actuated, as seen in Fig. 3, by means of an arm 32 pivotally connected at its lower end to a push rod 33 which is, in turn, universally pivotally connected as at 35 to the control stick 36 of the plane. The control stick 36 is suitably supported by means of a fitting 37 to the end of a rock shaft 38. A conventional push rod 39 is pivotally connected to the lower end of the stick 36 and is adapted to actuate the elevator control mechanism 21 in the usual manner. The ratio of movement of the control stick 36 to the movement of the auxiliary elevators 30, and hence the relative movement of the auxiliary elevators to the tail structure, may be varied by suitably positioning the pivot 35 on the stick 36.

As seen in Fig. 5, the supplemental wing surface 25a may be made rotatable as a unit and controlled by a mechanism similar to that described for the modification shown in Figs. 3 and 4.

While the invention has been described with respect to one particular type of aircraft, it is obvious that any high speed airplane of either pusher or tractor type, having motor nacelles arranged on one or both sides of the fuselage and in close proximity thereto, may give rise to turbulent waves blanketing the control surfaces in a similar manner to that described above, so that the auxiliary control surfaces, in accordance with this invention, would be applicable to such an aircraft.

In the case of a single engined aircraft the possibilty of air burbling or turbulent waves seriously affecting the horizontal tail surface is more remote. However, should such a condition arise, the invention is accordingdy applicable to such a single engined aircraft to limit the loss of control under such conditions.

What I claim is:

1. In an airplane, a main wing structure, a tail structure, two fuselages parallelly spaced apart in fixed position on said wing and tail structures, a nacelle fixed to said wing structure intermediate said fuselages, whereby said tail structure is subject to blanketing by turbulent wake at trans-sonic speed, a supplemental wing carried by said nacelle forward of said main wing structure at a predetermined positive angle adapted to provide lift to the forward end of said airplane, a trim tab carried on said tail structure said trim tab normally adjusted to trim out the lift of said supplemental wing, whereby the lift effect of said supplemental wing is automatically neutralized at sub-sonic speeds but automatically becomes effective at trans-sonic speeds when said tail structure and said trim tab are blanketed.

2. In an airplane, a main wing structure, a tail structure, one or more fuselages fixed to said wing and tail structures, a nacelle fixed to said wing structure whereby said tail structure is subject to blanketing by turbulent wake at trans-sonic speed, a supplemental wing carried by said airplane at fixed positive lift angle forward of said main wing structure, a trim tab carried on said tail structure, said trim tab normally adjusted to counterbalance the lift of said supplemental wing, whereby the lift effect of said supplemental wing is automatically neutralized at sub-sonic speeds and automatically made effective at trans-sonic speeds.

3. In an airplane having a main wing structure, a tail structure and a fuselage supporting the main wing and the tail structures, said tail structure being subject to blanketing by turbulent wake at trans-sonic speed, a supplementary wing carried by said airplane forward of said main wing structure at fixed positive lift angle, and a trim tab carried by said airplane in a position which is subject to said blanketing and being adjusted to a negative angle which normally counterbalances the positive lift effect of said supplementary wing but allows said lift effect to become operative automatically when blanketing of said trim tab takes place.

4. In an airplane having a main wing structure and having a tail structure which is subject to blanketing by turbulent wake from the main wing structure at trans-sonic speeds, a supplementary wing of fixed positive lift angle carried by the airplane out of the zone of said turbulent wake, a trim tab carried by the airplane within the zone of said turbulent wake, said trim tab being adjusted to an angle which normally counterbalances the positive lift effect of said supplementary wing, whereby said lift effect becomes automatically operative when said trim tab is blanketed by said turbulent wake.

SAMUEL R. BRENTNALL.

REFERENCES CITED

The following references are of record in the file of this patent:

UNITED STATES PATENTS

| Number | Name | Date |
|---|---|---|
| D. 116,094 | Johnson | Aug. 8, 1939 |
| D. 119,714 | Hibbard et al. | Mar. 26, 1940 |
| 1,210,376 | James | Dec. 26, 1916 |
| 2,023,334 | Marmonier | Dec. 3, 1935 |
| 2,402,311 | Bissett | June 18, 1946 |

FOREIGN PATENTS

| Number | Country | Date |
|---|---|---|
| 359,087 | Great Britain | Oct. 22, 1931 |
| 546,588 | Great Britain | Aug. 9, 1941 |
| 802,610 | France | June 13, 1936 |